United States Patent [19]

Töpfl et al.

[11] Patent Number: 5,223,177
[45] Date of Patent: Jun. 29, 1993

[54] ALKALI-RESISTANT FOAM SUPPRESSANT WHICH IS FREE FROM SILICONE OIL

[75] Inventors: Rosemarie Töpfl, Dornach; Christian Guth, Birsfelden, both of Switzerland

[73] Assignee: Ciba-Geigy Corporation, Ardsley, N.Y.

[21] Appl. No.: 863,361

[22] Filed: Apr. 1, 1992

Related U.S. Application Data

[63] Continuation of Ser. No. 452,646, Dec. 18, 1989, abandoned.

[30] Foreign Application Priority Data

Jan. 9, 1989 [CH] Switzerland ............... 58/89
Sep. 7, 1989 [CH] Switzerland ............ 3249/89

[51] Int. Cl.⁵ .............................. B01D 19/04
[52] U.S. Cl. ..................... 252/321; 252/358
[58] Field of Search ........... 252/321, 358, 8.6, 174.21, 252/174.25

[56] References Cited

U.S. PATENT DOCUMENTS

| | | | |
|---|---|---|---|
| 2,653,911 | 2/1952 | Fields et al. | 252/321 |
| 2,888,489 | 5/1959 | Horsley et al. | 252/174.21 X |
| 2,965,581 | 12/1960 | Hyatt et al. | 252/321 |
| 3,793,223 | 2/1974 | Lichtman et al. | 252/358 |
| 3,943,178 | 3/1976 | Stein et al. | 252/351 X |
| 4,071,468 | 1/1978 | Abel et al. | 252/321 |
| 4,230,599 | 10/1980 | Elfers | 252/321 |
| 4,302,349 | 11/1981 | Kosswig et al. | 252/358 X |
| 4,559,162 | 12/1985 | Abel et al. | 252/321 |
| 4,767,568 | 8/1988 | Abel et al. | 252/321 |
| 4,913,833 | 4/1990 | Otten et al. | 252/174.21 X |
| 5,002,686 | 3/1991 | Guth et al. | 252/174.16 |
| 5,009,668 | 4/1991 | Berendt et al. | 252/358 X |

OTHER PUBLICATIONS

Derwent Abstract, 81-70126D/39 corresponding to EP 35,702.
Derwent Abstract 86-249491/38 (corresponding to J61-178005-A) Sep. 8, 1986.
Patent Abstracts of Japan, vol. 11, No. 38 (C-401) Feb. 4, 1987, 21.C 401 (J61-204012A).
Derwent Abstract, 74-34795V/19 (corresponding to DE 2250975).
4402 Chemical Abstracts, vol 76 (1972) 44697f.
6001 Chemical Abstracts, vol. 106 (1987) 86720b.

*Primary Examiner*—Robert L. Stoll
*Assistant Examiner*—Daniel S. Metzmaier
*Attorney, Agent, or Firm*—Kevin T. Mansfield; Edward McC. Roberts

[57] ABSTRACT

Alkali-resistant foam suppressant which is free from silicone oil, containing
(a) a homopolymer of an aliphatic $C_2$–$C_{12}$alkyl ester of (meth)-acrylic acid or a copolymer of this alkyl ester with a di-$C_2$–$C_{12}$alkyl ester of an ethylenically unsaturated dicarboxylic acid,
(b) an anionic or nonionic emulsifier and
(c) an apolar solvent, its preparation and its use for suppressing foam in aqueous systems.

17 Claims, No Drawings

ALKALI-RESISTANT FOAM SUPPRESSANT WHICH IS FREE FROM SILICONE OIL

This application is a continuation of application Ser. No. 452,646, filed Dec. 18, 1989 now abandoned.

The present invention relates to an alkali-resistant foam suppressant which is free from silicone oil, a process for its preparation and its use.

Foam suppressants containing silicone oil such as are described, for example, in U.S. Pat. No. 4,071,468 to have an inadequate action in alkaline aqueous systems and often lead to the formation of stains. Foam suppressants which contain no silicone oil have also been disclosed in European Patent B 35,702. However, these foam suppressants have an inadequate storage stability and give use liquors of low stability.

Foam suppressants which do not have these disadvantages have now been found.

The present invention thus relates to an alkali-resistant foam suppressant which is free from silicone oil and contains (a) a homopolymer of an aliphatic $C_2$–$C_{12}$alkyl ester of (meth)-acrylic acid or a copolymer of this alkyl ester with a di-$C_2$–$C_{12}$alkyl ester of an ethylenically unsaturated dicarboxylic acid,
(b) an anionic or nonionic emulsifier and
(c) an apolar solvent.

Possible components (a) are both copolymers and, in particular, also homopolymers. Preferred monomers of these copolymers are ethyl, n-butyl or 2-ethyl-n-hexylacrylate or methacrylate on the one hand and maleic or fumaric acid esters on the other hand, the acrylates being preferred over the methacrylates. In copolymers of n-butylacrylate and di-$C_2$–$C_8$alkyl maleates, the weight ratio is preferably 1:1. Homopolymers of ethyl, n-butyl and 2-ethyl-n-hexyl acrylates are therefore of prime interest. These co- and homopolymers which are known per se are prepared by methods which are likewise known per se. To prepare the homopolymers, the monomers of the type mentioned are polymerized in the presence of a solvent. Examples of solvents which may be mentioned are di-, tetra- or decahydronaphthaline, a benzene which is subsituted by methyl or ethyl, a cycloalkanol having 4 to 6 carbon atoms, a straight-chain or branched alkanol having 6 to 12 carbon atoms, an alkylen oxide adduct of glycerol or pentaerythritol or a $C_2$–$C_8$alkyl ester of a straight-chain or branched carboxylic or hydroxy carboxylic acid, such as of lactic and 2-ethylhexanoic acid. The monomers are preferably polymerized in the presence of a polymerization catalyst, such as azobisisobutyronitrile or peroxides, such as benzoyl peroxide, in general at elevated temperatures of, for example 50 to 100, in particular 70° to 90° C., and in an inert atmosphere, that is to say using an inert gas, such as nitrogen. The amounts of solvent are preferably in general employed so that a 30 to 60, preferably 40 to 50 percent strength by weight solution of component (a) is obtained, the monomers being dissolved in the solvent before the polymerization and the resulting solution of the homopolymer being further diluted if necessary, to give the content of homopolymer mentioned, using the solvent or a commercially available hydrocarbon mixture of paraffins, if appropriate naphthenes and aromatics. To prepare the copolymers, on the other hand, the monomers of the type mentioned are polymerized in the absence of a solvent. The resulting copolymers are then mixed with the abovementioned solvents or commercially available hydrocarbon mixtures until the stated percentage content is obtained. The resulting solution can then be used for the preparation of a foam suppressant according to the invention.

The abovementioned esters are prepared in a manner which is known per se by reaction of the (meth)acrylic acid or dicarboxylic acid, such as maleic or fumaric acid, or the anhydride thereof, with an alkanol having 2 to 12 C atoms, such as ethanol, propanol, isopropanol, butanol and isomers thereof, amyl alcohol and isomers thereof, n-hexyl alcohol, n-octyl alcohol, capryl alcohol, 2-ethylhexanol, 2-butylhexanol, trimethylhexanol, n-decyl alcohol and lauryl alcohol.

The reaction products of acrylic acid and n-butyl alcohol and of maleic acid or the anhydride thereof with 2-ethyl-hexanol are preferred.

The commercially available hydrocarbon mixtures are, in particular, aliphatic straight-chain or branched hydrocarbons which are mixed, if appropriate with naphthenes and aromatics. Such mixtures have a high boiling range of about 180° to about 500° C., an aniline point of about 70° to about 120° C. and a kinematic viscosity at 20° C. of about 1 to about 100 mm$^2$/s. Examples which may be mentioned of purely aliphatic hydrocarbon mixtures are straight-chain hydrocarbons having a boiling range from 170° to 250° C., an aniline point of 80° to 85° C. and a kinematic viscosity at 25° C. of 1.6 to 2 mm$^2$/s, and which are obtainable as SHELLSOL TD, T or K ® (brand name, SHELL). Examples which may be mentioned of purely aliphatic hydrocarbon mixtures having branched chains are mixtures having a boiling range of 110° to 260° C., an aniline point of 75° to 90° C. and a kinematic viscosity at 25° C. of 20 to 300 mm$^2$/s, which are obtainable as ISOPAR E, G, H, K, L or M ® (brand name ESSO). Hydrocarbon mixtures which also contain napthenes and aromatics in addition to aliphatics, for example those of 45 to 70 percent by weight of paraffins, 25 to 45 percent by weight of naphthenes and 5 to 20, in particular 7 to 9 percent by weight of aromatics, are also possible.

Such mixtures as a rule have a boiling range from 340° to 470° C., a kinematic viscosity at 20° C. of 20 to 100 mm$^2$/s, a pour point of $-5°$ to $-50°$ C. and an aniline point of 75° to 110° C. A readily accessible commercially available hydrocarbon mixture which, for example, is possible is, for example, PROCESSOIL ES 320 ® (brand name, ESSO).

If such mixtures are employed for the preparation of component (a), it is necessary to add the abovementioned solvents.

Possible components (b) are addition products of styrene oxide on a $C_6$–$C_{22}$fatty alcohol alkoxilate, and $C_6$–$C_{22}$fatty acid amides. The addition products can be in the form of nonionic non-esterified products or anionic esterfied products. Addition products of 2 to 6 mole of ethylene oxide or propylene oxide onto 1 mole of the said styrene oxide addition products may also be mentioned as component (b).

The addition products used as component (b) are novel compounds per se, which can be obtained by addition of styrene oxide onto polyalkylene glycol ethers of the formula

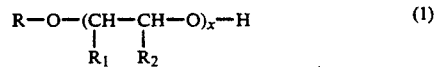

in which R is an aliphatic radical, of $R_1$ and $R_2$ one is hydrogen and the other is —$CH_3$, or $R_1$ and $R_2$ are both hydrogen, and x is a number from 1 to 100 preferably 4 to 80.

The addition products can also be in the form of their acid esters and salts thereof.

A preferred possible aliphatic radical R is the hydrocarbon radical of an unsaturated or saturated aliphatic mono alcohol having 4 to 22 C atoms. This radical can be straight-chain or branched and preferably has 8 to 22 C atoms.

The aliphatic saturated mono alcohols are, for example, synthetic and naturally occurring alcohols, such as n-butyl, lauryl, myristyl, cetyl, stearyl, arachidyl or behenyl alcohol, and synthetic alcohols, such as oxo alcohols, for example 2-methylpentanol, 2-ethylhexanol, 2-propylheptanol, 2-octyldodecanol, 1,1,3,3-tetramethylbutanol, isononyl alcohol, trimethylhexanol, trimethylnonyl alcohol, hexadecyl alcohol or the Alfols ® (linear primary alcohols) having 8 to 18 C atoms. Representatives of these Alfols are, for example, Alfol ® 810, Alfol ® 1012, Alfol ® 1214 or Alfol ® 1618.

Examples of unsaturated aliphatic mono alcohols are dodecenyl alcohol, hexadecenyl alcohol or oleyl alcohol.

The alcohol radicals can be present individually or in the form of mixtures of two or more components, for example mixtures of alkyl and/or alkenyl groups which are derived from soya fatty acids, palm-kernel fatty acids or tallow oils.

($CHR_1$—$CHR_2$—O)$_x$— chains are preferably of the ethylene glycol, propylene ethylene glycol or ethylene propylene glycol type; the first is particularly preferred. x is preferably 4 to 40.

The styrene oxide addition products are prepared by first etherifying the aliphatic mono alcohol with 1 to 100 mole of alkylene oxide (ethylene oxide and/or propylene oxide), and then adding 1 mole of styrene oxide onto the resulting polyalkylene glycol ether. If desired, 2 to 6 mole of ethylene oxide or propylene oxide can be added onto these addition products.

Specific examples which may be mentioned of the polyalkylene glycol ethers which are of the formula (1) and are required for styrene oxide addition are the addition product of 2.5 mole of ethylene oxide on 1 mole of $C_9$-$C_{11}$oxo alcohol the addition product of 4 mole of ethylene oxide on 1 mole of $C_9$-$C_{11}$oxo alcohol the addition product of 5 mole of ethylene oxide on 1 mole of $C_9$-$C_{11}$oxo alcohol the addition product of 35 mole of ethylene oxide on 1 mole of stearyl alcohol the addition product of 36 mole of ethylene oxide on 1 mole of stearyl alcohol the addition product of 18 mole of ethylene oxide on 1 mole of $C_{12}$-$C_{18}$fatty alcohol mixture (Cetalol 50-55)

the addition product of 10 mole of ethylene oxide on 1 mole of 2-ethylhexanol, the addition product of 4 mole of ethylene oxide and 12 mole of propylene oxide on 1 mole of $C_9$-$C_{11}$oxo alcohol the addition product of 8 mole of ethylene oxide and 12 mole of propylene oxide on 1 mole of $C_{12}$-$C_{13}$fatty alcohol the addition product of 6 mole of ethylene oxide and 6 mole of propylene oxide on 1 mole of $C_9$-$C_{11}$oxo alcohol the addition product of 18 mole of ethylene oxide on 1 mole of cetyl alcohol the addition product of 3 mole of ethylene oxide on 1 mole of isotridecyl alcohol the addition product of 9 mole of ethylene oxide on 1 mole of isotridecyl alcohol the addition product of 80 mole of ethylene oxide on 1 mole of oleyl alcohol the addition product of 10 mole of ethylene oxide on 1 mole of isotridecyl alcohol the addition product of 20 mole of ethylene oxide on 1 mole of oleyl alcohol the addition product of 3 mole of ethylene oxide on 1 mole of lauryl alcohol the addition product of 2, 4, 6 or 15 mole of ethylene oxide on 1 mole of nonyl alcohol the addition product of 1 or 2 mole of ethylene oxide on 1 mole of n-butyl alcohol.

The acid esters can be present in the form of mono- or diesters or half-esters and as free acids or, preferably, as salts, for example alkali metal salts or ammonium salts, depending on the acid radical. Alkali metal salts which may be mentioned in particular are the sodium, potassium or lithium salts, and ammonium salts which may be mentioned are the ammonium, dimethylammonium, trimethylammonium, monoethanolammonium, diethanolammonium and triethanolammonium salts. The acid esters are preferably prepared as ammonium salts.

The acid esters are prepared by reacting the styrene oxide addition product according to the invention with an at least dibasic oxygen acid and converting the acid ester obtained into the abovementioned salts.

For the polybasic oxygen acids which can be used for the formation of the acid esters are non-sulfonated or sulfonated organic, preferably aliphatic dicarboxylic acids having 3 to 6 carbon atoms, for example maleic acid, malonic acid, succinic acid or sulfosuccinic acid, or polybasic inorganic oxygen acids, for example sulfuric acid or orthophosphoric acid. Instead of the acids, functional derivatives thereof, such as acid anhydrides, acid halides, acid esters or acid imides, can be used. Examples which may be mentioned of these functional derivatives are maleic anhydride, chlorosulfonic acid and sulfamic acid.

The esterification is as a rule carried out by simply mixing the reaction partners while heating, advantageously at a temperature between 50° and 100° C. The free acids initially formed can then be converted into the corresponding alkali metal salts or ammonium salts. They are converted into the salts in the customary manner by addition of bases, for example ammonia, monoethanolamine, triethanolamine or alkali metal hydroxides, for example sodium hydroxide or potassium hydroxide. According to a particularly preferred embodiment, acid sulfuric acid esters are prepared directly in the form of their ammonium salts by heating the styrene oxide addition products with sulfamic acid, advantageously in the presence of urea.

Styrene oxide addition products which are important in practice are those of the formula

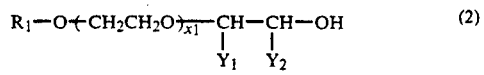   (2)

in which $R_1$ is alkyl or alkenyl having in each case 8 to 22 carbon atoms, of $Y_1$ and $Y_2$ one is phenyl and the other is hydrogen and $x_1$ is 4 to 80.

Preferred acid esters prepared using an inorganic or organic acid are those of the formula

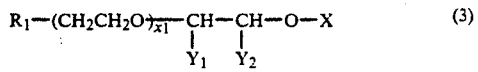 (3)

or of the formula

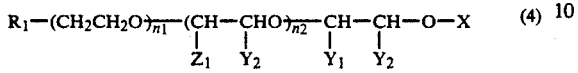 (4)

in which $R_1$, $Y_1$, $Y_2$ and $x_1$ are as defined above, of $Z_1$ and $Z_2$ one is methyl and the other is hydrogen, X is the maleic acid, sulfosuccinic acid, sulfuric acid or phosphoric acid radical and the sum of $n_1+n_2$ is 4 to 30, preferably 6 to 18.

Particularly preferred acid esters of the formulae (3) and (4) contain either a maleic acid ester group or a sulfuric acid ester group, which is preferably in the form of its alkali metal salts or ammonium salts.

Possible components (b) are also $C_1$–$C_4$alkyl and in particular $C_2$–$C_{12}$ alkanolamides of fatty acids having 6 to 22 C atoms. Fatty acid dialkanolamides having 8 to 22 C atoms in the fatty acid radical and 2 to 12 carbon atoms in the alkanol radical are preferred. These are, for example, fatty acid-alkanolamine reaction products which are prepared from fatty acids having 8 to 22, preferably 8 to 18, carbon atoms and alkanolamines having preferably 2 to 6 carbon atoms, such as ethanolamine, diethanolamine, isopropanolamine or di-isopropanolamine, diethanolamine being preferred. Fatty acid diethanolamides having 8 to 18 carbon atoms are particularly preferred. Examples of suitable fatty acids are caprylic, capric, lauric, myristic, palmitic, stearic, arachic, behenic, oleic, linoleic, linolenic or arachidonic acid or coconut fatty acid. Preferred examples of such reaction products are coconut fatty acid diethanolamide and the diethanolamide of lauric acid or stearic acid.

Possible components (c) are organic solvents, for example aliphatic and aromatic hydrocarbons, halogenated hydrocarbons and tertiary amines. Straight-chain and in particular branched alkanols having 6 to 22 C atoms are preferred. The alkanols branched in the 2-position, for example 2-methylpentanol, 2-ethylhexanol, 2-propylheptanol, 2-butyloctanol, 2-hexyldecanol, 2-octyldodecanol and 2-nonyltridecanol are of particular interest.

The foam suppressants according to the invention can contain other additives customary in such agents, in particular commercially available surface-active hydrophilic adducts of an organopolysiloxane and ethylene oxide and/or propylene oxide and other anionic surfactants.

The organopolysiloxanes as the starting substance for such adducts in principle correspond to the commercially available silicone oils such as are described, for example, in U.S. Pat. Nos. 3,697,440 and 3,793,223. Of these silicone oils, the polydimethylsiloxanes are again of prime interest. The possible siloxanoxyalkylene copolymers can be prepared, for example from halogen-substituted organopolysiloxanes, in particular polydimethylsiloxanes, and alkali metal salts of polyoxyalkylene, for example polyethylene glycols and/or polypropylene glycols.

The siloxanoxyalkylene copolymers are polyether-siloxanes which advantageously have a turbidity point at about 20° to 70° C., preferably 25° to 50° C. The glycol content consisting of oxyethylene groups or oxyethylene and oxypropylene groups is advantageously 35 to 85, preferably 40 to 75 percent by weight, based on the total weight of the polyether-siloxane.

A preferred embodiment of such a copolymer is accordingly a water-soluble block polymer of a polydimethylsiloxane and ethylene oxide or a copolymer of ethylene oxide and propylene oxide which has a dynamic viscosity at 25° C. of 500 to 3000 mPa.s (Brookfield LVT, Spindel 3, 30 revolutions/minute) and a turbidity point of 20° to 70° C.

Such block polymers or polyether-siloxanes can be represented by the probable formula

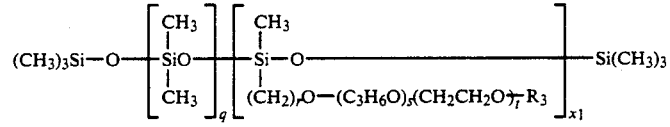

in which q is 3 to 50, advantageously 3 to 25, r is 2 or 3, s is 0 to 15, t is 1 to 25, $x_1$ is 3 to 10 and $R_3$ is alkyl having 1 to 4 carbon atoms, preferably methyl.

Such polyether-siloxanes are described, for example, in U.S. Pat. Nos. 2,834,748, 3,389,160, 3,505,277, 3,507,815 and 3,629,308.

Other polyether-siloxanes which can be used as component (d) are those of the probable formula

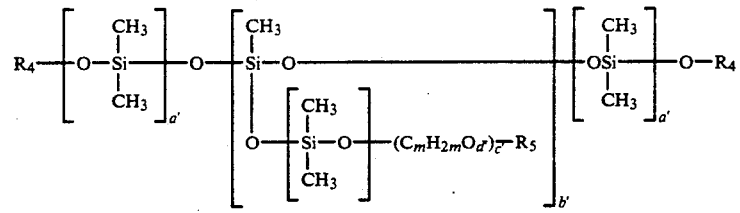

in which $R_4$ and $R_5$ are each alkyl having 1 to 4 carbon atoms, preferably methyl, a' is 1 to 20, b' is 2 to 20, c' is 1 to 50, d' is 1 or 2, preferably 1, and m is 2 to 5.

Such siloxane compounds are described in U.S. Pat. No. 3,183,254.

Preferred possible anionic surfactants are salts of fatty acids having 8 to 22 C atoms, for example the alkali metal or ammonium salts of lauric, myristic, palmitic, stearic and oleic acid or their mixtures, such as are contained, for example in the coconut oil and palm-kernel oil acids.

Preferred foam suppressants contain 20 to 60, preferably 30 to 55% by weight of component (a), 1 to 10, preferably 1 to 5% by weight of component (b) and 10 to 50, preferably 35 to 50% by weight of component (c).

Particularly preferred foam suppressants additionally also contain 1 to 15, preferably 1 to 10% by weight of a siloxanoxialkylene copolymer and 1 to 10, preferably 1 to 5% by weight of an anionic surfactant.

The foam suppressants according to the invention are prepared in general by mixing component (a) with component (c) to give a homogeneous mixture and adding component (b), while stirring, to the resulting mixture.

The agents according to the invention can be used for suppressing foaming in aqueous systems. They are employed in amounts of 0.2 to 3, preferably 0.5 to 1 g per liter of aqueous system.

In the following preparation and use examples, unless stated otherwise, the percentages relate to the weight; parts are parts by weight.

PREPARATION EXAMPLES

A) Preparation of component (a)

Example 1

A mixture of 150 g of n-butylacrylate and 150 g of di-2-ethylhexyl maleate is heated at 70° C. in a stirred flask flushed with nitrogen, while stirring. 0.5 g of azodiisobutyronitrile is then added, whereupon the temperature rises to 75° C. After this, a solution of 750 g of n-butylacrylate and 750 g of di-2-ethylhexyl maleate is added dropwise to the reaction mixture in the course of 3 ½ hours. During this period, 6 portions of 0.3 g of azodiisobutyronitrile are added at intervals of 30 minutes. The reaction is exothermic and the temperature rises to 115° C. When the feed has ended, 0.5 g of azodiisobutyronitrile is added, and this addition is repeated 3 times, in each case after 1 hour. The mixture is then cooled to 90° C. and subsequently stirred at this temperature for a further 6 hours. A copolymer is obtained, the viscosity of which at 25° C. is 31,750 mPa.s.

Example 2

75 g of n-butylacrylate, dissolved in 225 g of 2-ethylhexyl lactate, are initially introduced into a stirred flask flushed with nitrogen and are heated to 75° C. 0.5 g of azodiisobutyronitrile is added to the reaction mixture, the temperature of the reaction mixture rising to 86° C. A solution of 825 g of n-butylacrylate in 675 g of 2-ethylhexyl lactate is then added dropwise to the reaction mixture in the course of 4 hours. During this period, 5 portions of 0.3 g of azodiisobutyronitrile are added at intervals of 45 minutes. The reaction is exothermic and the temperature rises to 93° C. When the feed has ended, 0.5 g of azo-di-isobutyronitrile is added and this addition is repeated 4 times in each case after 1 hour. The temperature is kept at 90° C. and the mixture is subsequently stirred at this temperature for a further 6 hours. A clear colourless 50% resin solution, the viscosity of which at 25° C. is 250 mPa.s, is obtained.

Example 3

The procedure is as described in Example 2, but 2-ethylhexyl 2-ethylhexanoate is used as the solvent, instead of 2-ethylhexyl lactate. A clear colourless 50% resin solution, the viscosity of which at 25° C. is 1,750 mPa.s is obtained.

Example 4

50 parts of ethylacrylates are dissolved in 50 parts of 2-ethyl-n-hexanol in an inert nitrogen atmosphere and the solution is heated to 80° C. The reaction mixture is kept under a nitrogen atmosphere at this temperature for 8 hours, in each case 0.5 part of benzoylperoxide being added, as a catalyst, to the reaction mixture at the start of the 8-hour reaction time and after a reaction time of one and two hours. The reaction mixture is then cooled to 30° C. and diluted with 25 parts of 2-ethyl-n-hexanol. A 40% clear solution of the homopolymer in 2-ethyl-n-hexanol, the viscosity of which at 25° C. is 448 mPa.s, is obtained.

Example 5

25 parts of n-butyl acrylate are dissolved in 25 parts of 2-ethyl-n-hexanol in an inert nitrogen atmosphere and this solution is heated to 70° C. 0.03 part of azodiisobutyronitrile are added as a catalyst to the reaction mixture, the temperature of the reaction mixture rising from 70° C. to 76° C. in the course of 4 minutes. A solution of 125 parts of n-butylacrylate in 125 parts of 2-ethyl-n-hexanol is then added to the reaction mixture in the course of 165 minutes. In each case 0.3 part of azodiisobutyronitrile is added to the reaction mixture at the start of the 165-minute feed period and after a feed of 35, 70 and 105 minutes. The reaction mixture is kept totally, that is to say from the start of the feed, under an inert nitrogen atmosphere at 70° to 76° C. for 8 hours. The reaction mixture is then cooled to 25° C. A 50% clear solution of the homopolymer, the viscosity of which at 25° C. is 2,008 mPa.s, is obtained.

Example 6

The procedure is as described in Example 4, but 50 parts of 2-ethyl-n-hexylacrylate are employed and the reaction mixture is cooled to 25° C. after the 8-hour reaction time, without dilution with 2-ethyl-n-hexanol. A 50% clear solution of the homopolymer in 2-ethyl-n-hexanol, the viscosity of which at 25° C. is 560 mPa.s, is obtained.

Example 7

The procedure is as described in Example 4, but 50 parts of n-butylacrylate and 50 parts of trimethylbenzene (industrial isomer mixture) are employed and the reaction mixture is cooled to 25° C. after the 8-hour reaction time. A 50% clear solution of the homopolymer in trimethylbenzene, the viscosity of which at 25° C. is 135 mPa.s, is obtained.

Example 8

The procedure is as described in Example 4, but 50 parts of n-butylacrylate and 50 parts of trimethylhexanol (industrial mixture of primary iso-nonanols with 3,5,5-trimethylhexanol as the main constituent) are employed and the reaction mixture is cooled to 25° C. after the 8-hour reaction time. A 50% clear solution of the homopolymer in trimethylhexanol, the viscosity of which at 25° C. is 3,000 mPa.s, is obtained.

Example 9

The procedure is as described in Example 4, but 50 parts of n-butylacrylate and 50 parts of a reaction product of glycerol and propyleneoxide (molecular weight of the reaction product: 4000) are employed and the reaction mixture is cooled to 25° C. after the 8-hour reaction time. A 50% clear solution of the homopolymer in the adduct of glycerol and propyleneoxide, the viscosity of which at 25° C. is 2,985 mPa.s, is obtained.

Example 10

The procedure is as described in Example 4, but 50 parts of n-butylacrylate and 50 parts of cyclohexanol are employed and the reaction mixture is cooled to 25° C. after the 8-hour reaction time. A 50% clear solution of the homopolymer in cyclohexanol, the viscosity of which at 25° C. is 580 mPa.s, is obtained.

Example 11

16.7 parts of n-butylacrylate are dissolved in 50 parts of n-hexanol in an inert nitrogen atmosphere and this solution is heated to 75° C. 0.25 part of azodiisobutyronitrile as a catalyst is added to the reaction mixture, the temperature of the reaction mixture rising from 75° C. to 82° C. in the course of 3 minutes. Thereafter, a solution of 183.3 parts of n-butylacrylate in 150 parts of n-hexanol is added to the reaction mixture in the course of 2 hours. In each case 0.25 part of azodiisobutyronitrile is added to the reaction mixture 45 minutes and 90 minutes after the start of the feed and 1 hour after the feed has ended. The reaction mixture is kept totally, that is to say from the start of the feed, under an inert nitrogen atmosphere at 75° to 82° C. in the course of 10 hours. The reaction mixture is then cooled to 25° C. A 50% clear solution of the homopolymer, the viscosity of which at 25° C. is 248 mPa.s, is obtained.

Example 12

The procedure is as described in Example 11, but n-octanol is employed instead of n-hexanol. A 50% clear solution of the homopolymer, the viscosity of which at 25° C., measured as in Example 4, is 440 mPa.s, is obtained.

Example 13

The procedure is as described in Example 4, but 50 parts of n-butylacrylate and 50 parts of an industrial mixture of straight-chain aliphatic hydrocarbons (boiling range 186°-214° C., kinematic viscosity at 25° C. 1.8 $mm^2/s$, aniline point 85° C.) are employed. A 50% solution, the viscosity of which at 25° C. is 605 mPa.s, is obtained.

Example 14

The procedure is as described in Example 4, but 50 parts of n-butylacrylate and 50 parts of an industrial mixture of aliphatic hydrocarbons containing branched chains (boiling range 192°-210° C., kinematic viscosity at 25° C. 21 $mm^2/s$, aniline point 85° C.) are employed. A 50% solution, the viscosity of which at 25° C. is 590 mPa.s, is obtained.

B) Preparation of component (b)

Example 15

163.8 g of an addition product of 4 mole of ethylene oxide on 1 mole of $C_9$-$C_{11}$ oxo alcohol (OH number: 171) are mixed with 3.3 g of sulfuric acid (96%) and the mixture is heated to 65° C. 60 g of styrene oxide are then added dropwise in the course of 35 minutes, the temperature rising to 87° C. The reaction product is subsequently stirred at 75° C. for 5 hours, neutralized with sodium bicarbonate solution and filtered. The filtrate is concentrated and the residue is dried. This gives a yellowish clear product of the formula $$C_9\text{—}C_{11}\text{—Alkyl—O—}(CH_2CH_2O)_4\text{—CH—CH}_2\text{—OH} \quad (I)$$
$$|$$
$$\text{(phenyl)}$$

OH number: 127

Example 16 a) 350 g of an addition product of 35 mole of ethylene oxide on 1 mole of stearyl alcohol (OH number: 32) are mixed with 5.6 g of sulfuric acid (96%) and the mixture is heated to 70° C. 24 g of styrene oxide are then added dropwise at 70°–75° C. in the course of 30 minutes. The mixture is subsequently stirred at 75° C. for 8 hours and then neutralized with sodium bicarbonate solution and filtered. The filtrate is concentrated and the residue is dried. This gives a product which is waxy at room temperature and has the formula $$C_{18}H_{37}\text{—O—}(CH_2CH_2\text{—O})_{\overline{35}}\text{—CH—CH}_2\text{—OH} \quad (II)$$
$$|$$
$$\text{(phenyl)}$$

OH number: 30 b) 185 g of the product of the formula (II) prepared according to (a) are heated to 70° C. and mixed with 10 g of urea. After 15 minutes, 10 g of sulfamic acid are added and the mixture is stirred at 80° C. for 1 hour and at 95° C. for 2 hours. The reaction product is then diluted with 307.5 g of water and stirred at 65°–70° C. until dissolution is complete. This gives a product which is gelatinous at room temperature and has the formula $$C_{18}H_{37}\text{—O}(CH_2CH_2O)_{\overline{35}}\text{—CH—CH}_2\text{—O—SO}_3NH_4 \quad (III)$$
$$|$$
$$\text{(phenyl)}$$

Example 17

112 g of the styrene oxide addition product of the formula (II) prepared according to Example 16(a) are slowly heated to 70° C. with 6.0 g of maleic anhydride and the mixture is stirred at this temperature for 1 hour. The reaction mixture is then stirred at 90° C. for a further 3 hours. This gives a product which is waxy at room temperature and has the formula $$C_{18}H_{37}\text{O}(CH_2CH_2O)_{\overline{35}}\text{—CH—CH}_2\text{—O—CO—CH=CH—COOH} \quad (IV)$$
$$|$$
$$\text{(phenyl)}$$

Acid number: 29

Example 18

361 g of an addition product of 1 mole of ethylene oxide on 1 mole of n-butyl alcohol are heated to 50° C. together with 1.84 g of borontrifluoride-etherate. 240 g (2 mole) of styrene oxide are then added dropwise in the course of 1 hour, the temperature rising to 85° C. The mixture is then stirred at 85° C. for 15 minutes and the reaction mixture is subsequently cooled to 20° C. After the excess ethylene glycol monobutylether has been distilled off, the mixture is subjected to fractional distillation under a high vacuum.

This gives 230 g of a colourless product of the formula

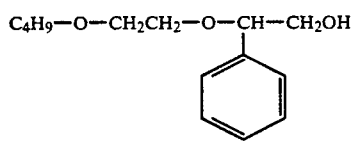

OH number: 252

Example 19

14.2 g of phosphorus pentoxide (0.1 mole) are added, at 20° C. while stirring rapidly, to 66.3 g of the reaction product prepared according to Example 18. During this addition, the temperature rises to 90° C. The mixture is subsequently stirred at 20° C. for 4 hours. The resulting product is a brown clear viscous mixture of the compounds of the formulae

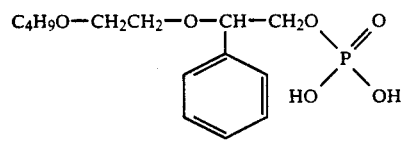

and

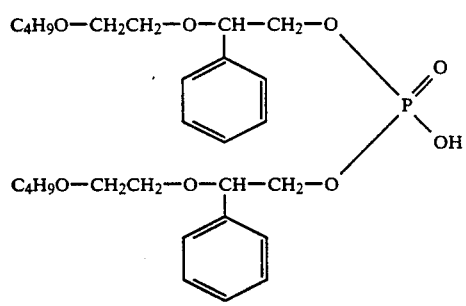

Example 20

508 g of an addition product of 3 mole of propylene oxide and 5 mole of ethylene oxide on 1 mole of dodecanol (OH number: 127.5) are mixed with 9.7 g of methane sulfonic acid and the mixture is heated to 70° C. Thereafter, 138.8 g of styrene oxide (1.157 mole) are added dropwise at 70°–80° C. in the course of 90 minutes. The mixture is then stirred at 80° C. for 3½ hours and subsequently neutralized with sodium bicarbonate solution and filtered. The filtrate is concentrated and the residue is dried. This gives a yellowish clear product of the formula

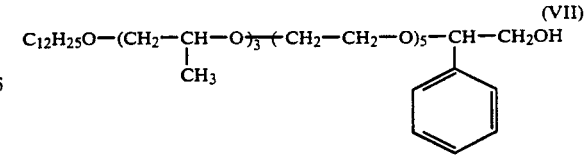

OH number: 90

Example 21

44 g (1 mole) of ethylene oxide are added to 220.4 g of the reaction product according to Example 15 at 140° C. under a pressure of 5 bar using Na methylate as the catalyst. This gives a yellowish, slightly cloudy product of the formula

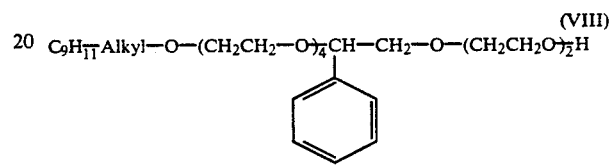

OH number: 114

Example 22

483 g of an addition product of 8 mole of ethylene oxide on 1 mole of $C_9$-$C_{11}$oxo alcohol (OH number: 116) are mixed with 9 g of sulfuric acid (96%) and the mixture is heated to 65° C. 120 g (1 mole) of styrene oxide are then added dropwise in the course of 60 minutes, the temperature rising to 82° C. The mixture is then subsequently stirred at 75° C. for 5 hours, neutralized with sodium bicarbonate solution and filtered. The filtrate is concentrated and the residue is dried. This gives a yellowish, clear product of the formula

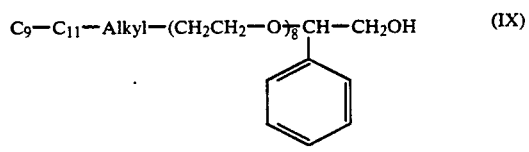

OH number: 91

Example 23

36.3 g of ethylene oxide (0.83 mole) are added to 255.5 g of the reaction product prepared according to Example 22 at 140° C. under a pressure of 5 bar and using Na methylate as the catalyst. This gives a yellowish, slightly cloudy product of the formula

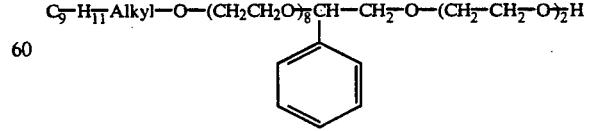

OH number: 100

A reaction carried out in a manner similar to that described in Examples 15 to 23 gives the following addition products of the formulae

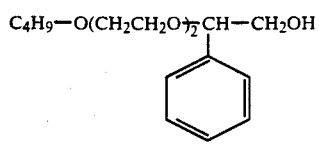 (XI)
OH number: 194
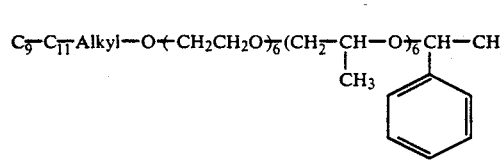 (XII)
OH number: 96
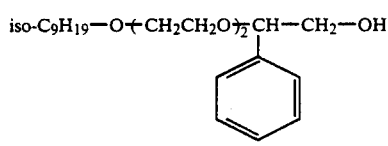 (XIII)
OH number: 159
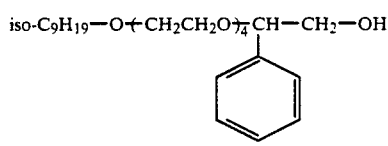 (XIV)
OH number: 119
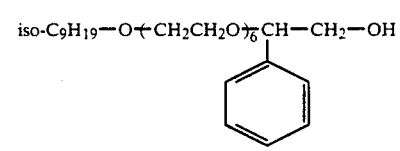 (XV)
OH number: 105
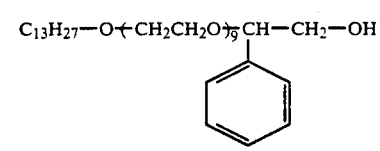 (XVI)
OH number: 78
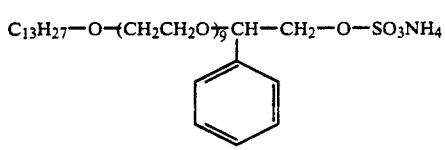 (XVII)
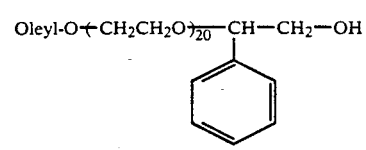 (XVIII)
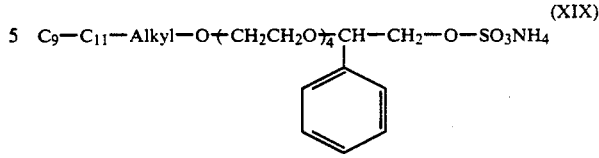 (XIX)
OH number: 47
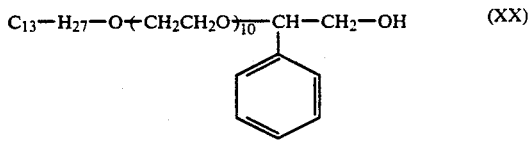 (XX)
OH number: 72
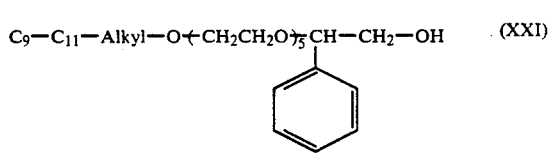 (XXI)
OH number: 111
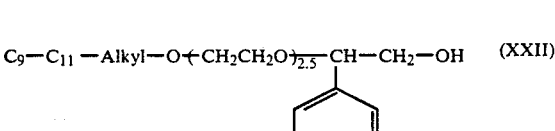 (XXII)
OH number: 140
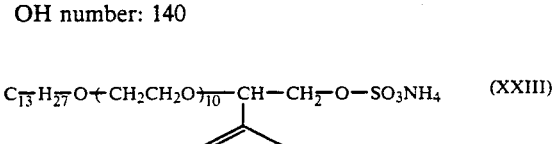 (XXIII)
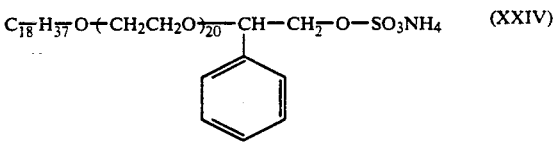 (XXIV)
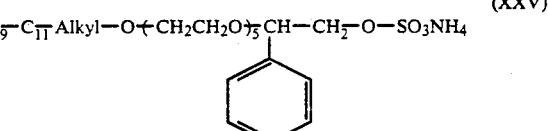 (XXV)
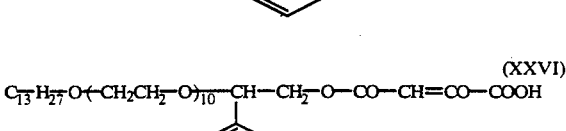 (XXVI)
Acid number: 65

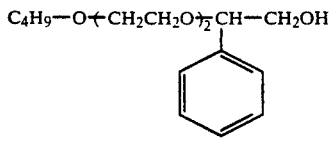

(XXVII)

OH number: 194 mixture of (XXVIII)

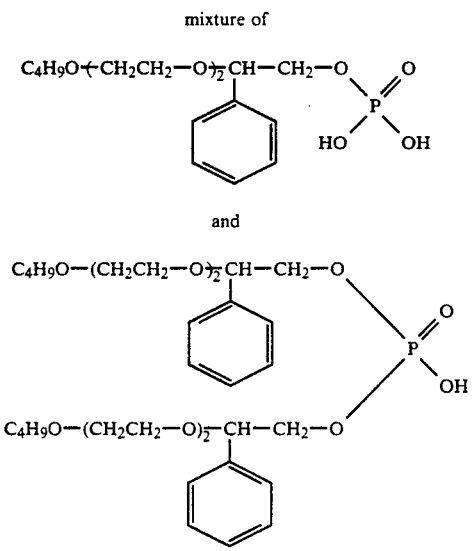

and

C) Preparation of the agents according to the invention

Example 24

470 g of the copolymer prepared according to Example 1 (component (a)) are mixed homogeneously with 390 g of isopalmityl alcohol (component (c)) at 20° C. for 10 minutes. Thereafter, 70 g of an ethoxylated polydimethylsiloxane and, in each case after 5 minutes, 35 g of oleic acid and 35 g of the addition product of 1 mole of styrene oxide on 1 mole of the adduct of 9 mole of ethylene oxide on 1 mole of isotridecyl alcohol (component (b)) are added to the homogeneous mixture, while stirring continuously. The mixture is further stirred for a few more minutes to give 1000 g of a yellowish clear solution.

Example 25

470 g of the copolymer prepared according to Example 1 (component (a)) are mixed homogeneously with 390 g of isopalmityl alcohol (component (c)) at 20° C. for 10 minutes. Thereafter, 70 g of an ethoxylated polydimethylsiloxane and, in each case after 5 minutes, 35 g of oleic acid and 35 g of coconut fatty acid diethanolamide (component (b)) are added to the homogeneous mixture, while stirring continuously. The mixture is further stirred for a few more minutes to give 1000 g of a yellowish clear solution.

Example 26

The procedure as described in Example 24 is repeated, but 35 g of the addition product of 1 mole of styrene oxide on 1 mole of the adduct of 4 mole of ethylene oxide on 1 mole of $C_9-C_{11}$ oxo alcohol are employed as component (b) instead of the addition product described in Example 24. 1000 g of a yellowish clear solution are obtained.

Example 27

490 g of the copolymer prepared according to Example 1 (component (a)) are mixed with 460 g of isopalmityl alcohol (component (c)) at 20° C. for 10 minutes. 50 g of the addition product of 1 mole of styrene oxide on 1 mole of the adduct of 2 mole of ethylene oxide on 1 mole of styrene oxide on 1 mole of the adduct of 2 mole of ethylene oxide on 1 mole of isononyl alcohol are then added to the homogeneous mixture, while stirring, and the mixture is further stirred for a few more minutes. This gives 1000 g of a clear yellowish solution.

Example 28

525 g of the copolymer prepared according to Example 1 (component (a)) are mixed with 435 g of isopalmityl alcohol (component (c)) at 20° C. for 10 minutes. Thereafter, 40 g of the addition product of 1 mole of styrene oxide on 1 mole of the adduct of 2 mole of ethylene oxide on 1 mole of isononyl alcohol are added to the homogeneous mixture, while stirring, and the mixture is further stirred for a few more minutes. This gives 1000 g of a clear yellowish solution.

Example 29

525 g of the copolymer prepared according to Example 5 (component (a)) are mixed with 435 g of isopalmityl alcohol (component (c)) at 20° C. for 10 minutes. Thereafter, 40 g of the addition product of 1 mole of styrene oxide on 1 mole of the adduct of 2 mole of ethylene oxide on 1 mole of isononyl alcohol are added to the homogeneous mixture, while stirring, and the mixture is further stirred for a few more minutes. This gives 1000 g of a clear yellowish solution.

APPLICATION EXAMPLES

Example 30

600 g of a mixture of 61% of the sodium salt of pentadecane-1-sulfonic acid, 8.1% of the addition product of 4 mole of ethylene oxide on 1 mole of a $C_9-C_{11}$ alkanol, 5% of methyldipropylene glycol, 10% of partial oligomers of 1-hydroxyethane-1,1-diphosphonic acid, 5% of sorbitol and 11% of an aqueous 50% potassium hydroxide solution are dissolved in 80 liters of water, and 10 liters of sodium hydroxide solution (30%) are added. To suppress foaming, 100 g of the agent prepared according to Example 26 are added to the mixture and the mixture is made up to 100 liters with water.

A raw cotton fabric of 220 g/m² is impregnated with the liquor thus prepared, squeezed off to liquor pick-up of 100% and steamed with saturated steam at 101° C. for 10 minutes. It is then rinsed hot and cold and dried and the CIBA-GEIGY whiteness is determined, which has the rating 10 (that of the raw untreated fabric is -73). The boiling-out liquor is now investigated for foaming properties in accordance with DIN 53902 and a foam height of 20 ml is found. In an identical liquor but without the agent according to the invention, the foam height is 300 ml.

If the agent according to Example 24 is used instead of the agent according to Example 26, the foam height is 15 ml.

Example 31

100 kg of cotton tricot are wetted in 600 liters of deionized water at 40° C. on a short liquor jet. 36 kg of sodium chloride, 5 kg of the reactive dyestuff of the formula

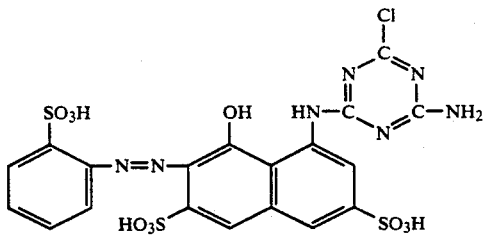

0.6 kg of the adduct of 9 mole of ethylene oxide on 1 mole of p-nonylphenol and 0.6 kg of the foam suppressant according to Example 24 are then introduced into the liquor. The substrate is dyed on the short liquor jet at 40° C. for 45 minutes. 0.6 kg of calcined sodium carbonate is then added, and 1.2 kg of an aqueous 30% sodium hydroxide solution are added after a further 5 minutes. The tricot is then dyed for a further 40 minutes and subsequently rinsed and re-washed. A fast level red dyeing of the tricot results. During the dyeing process, no interference in the run of the goods occurs. No foaming is to be found. If dyeing is carried out in the same manner but without addition of the agent according to Example 24, severe foaming and in some cases interference in the run of the goods occurs.

Example 32

100 parts of knitted goods of texturized polyester fibre is introduced in an incompletely flooded jet dyeing machine into 1,500 parts of hot water at 60° C. which contains 2 parts of ammonium sulfate and a finely dispersed dyestuff mixture of the following composition:
2.9 parts of the dyestuff C.I. Disperse Yellow 54, C.I. 47020,
2.6 parts of the dyestuff C.I. Disperse Red 151, C.I. 26130,
0.8 part of the dyestuff C.I. Disperse Blue 56, C.I. 63285,
2.0 parts of the ammonium salt of the acid sulfuric acid ester of an adduct of glycerol and propylene oxide having a molecular weight of 4,200 and
1.5 parts of the foam suppressant according to Example 26, and in which the pH has been adjusted to 5 with formic acid.

The temperature of the liquor is then increased to 130° C. in the course of 30 minutes and dyeing is carried out at this temperature for a further 60 minutes. During this period, it can be seen through the inspection window of the dyeing machine that the liquor issuing from the jets contains no foam at all. The liquor is then cooled to 70° C. The substrate is subjected to reductive cleaning, rinsing and drying in the customary manner.

A level brown dyeing with good penetration of the dye (diffusion) and good fastness properties is thus obtained.

Similarly good effects are also obtained if the foam suppressant according to Example 24 is employed instead of the foam suppressant according to Example 26.

We claim:
1. An alkali-resistant foam suppressant which is free from silicone oil, containing
  (a) a homopolymer of an aliphatic $C_2$–$C_{12}$alkyl ester of (meth)-acrylic acid or a copolymer of this alkyl ester with a di-$C_2$–$C_{12}$alkyl ester of an ethylenically unsaturated dicarboxylic acid,
  (b) a styrene oxide adduct of formula

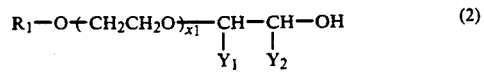

in which $R_1$ is alkyl or alkenyl having in each case 8 to 22 carbon atoms, one of $Y_1$ and $Y_2$ is phenyl and the other one is hydrogen and $x_1$ is 4 to 80, and
  (c) an apolar solvent.
2. A foam suppressant according to claim 1, which contains a homopolymer of an aliphatic $C_2$–$C_{12}$alkyl ester of (meth)acrylic acid as component (a).
3. A foam suppressant according to claim 2, which contains a homopolymer of n-butylacrylate as component (a).
4. A foam suppressant according to claim 1, which contains a copolymer of an aliphatic $C_2$–$C_{12}$alkyl ester of (meth)acrylic acid and a di-$C_2$–$C_{12}$alkyl ester of an ethylenically unsaturated dicarboxylic acid as component (a).
5. A foam suppressant according to claim 4, which contains a copolymer of n-butylacrylate and di-2-ethylhexyl maleate as component (a).
6. A foam suppressant according to claim 1, wherein component (c) is a straight-chain or branched $C_6$–$C_{22}$alkanol and component (a) is a homopolymer of an aliphatic $C_2$–$C_{12}$alkyl ester of (meth)-acrylic acid.
7. A foam suppressant according to claim 6, which contains a branched $C_6$–$C_{22}$alkanol as component (c).
8. A foam suppressant according to claim 1, which additionally contains an adduct of an organopolysiloxane and ethylene oxide and/or propylene oxide.
9. A foam suppressant according to claim 8, which contains a block polymer of a polydimethylsiloxane and ethylene oxide or a copolymer of a polydimethylsiloxane and ethylene and propylene oxide having a turbidity point of 20° to 70° C.
10. A foam suppressant according to claim 1, which additionally contains a $C_8$–$C_{22}$fatty acid or an alkali metal salt thereof.
11. A foam suppressant according to claim 1, which contains 20 to 60% by weight of component (a), 1 to 10% by weight of component (b) and 10 to 50% by weight of component (c).
12. A foam suppressant according to claim 11, which contains 30 to 55% by weight of component (a), 1 to 5% by weight of component (b) and 35 to 50% by weight of component (c).
13. A foam suppressant according to claim 11, which additionally contains 1 to 15% by weight of a siloxaneoxyalkylene copolymer and 1 to 10% by weight of an anionic surfactant.
14. A foam suppressant according to claim 12, which additionally contains 1 to 10% by weight of a siloxaneoxyalkylene copolymer and 1 to 5% by weight of an anionic surfactant.
15. A process for the preparation of the foam suppressant according to claim 1, which comprises mixing component (a) with component (c) to give a homogeneous mixture and adding component (b) to the resulting mixture, while stirring.
16. A process for suppressing foam in aqueous systems, which comprises applying an effective amount to suppress foam of a foam suppressant according to claim 1 to aqueous systems.
17. A process according to claim 16, which comprises applying 0.2 to 3 g of a foam suppressant according to claim 1 per liter of aqueous system.

* * * * *